(12) United States Patent
Koyama

(10) Patent No.: US 11,607,949 B2
(45) Date of Patent: Mar. 21, 2023

(54) SHOVEL

(71) Applicant: SUMITOMO CONSTRUCTION MACHINERY CO., LTD., Tokyo (JP)

(72) Inventor: Yoshito Koyama, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 345 days.

(21) Appl. No.: 16/898,630

(22) Filed: Jun. 11, 2020

(65) Prior Publication Data
US 2020/0299927 A1    Sep. 24, 2020

Related U.S. Application Data

(63) Continuation of application No. PCT/JP2018/045670, filed on Dec. 12, 2018.

(30) Foreign Application Priority Data

Dec. 13, 2017    (JP) .............................. JP2017-239019

(51) Int. Cl.
*B60K 15/073* (2006.01)
*B60K 15/035* (2006.01)
(Continued)

(52) U.S. Cl.
CPC ...... *B60K 15/073* (2013.01); *B60K 15/03504* (2013.01); *B60K 15/063* (2013.01); *B60K 15/067* (2013.01); *E02F 3/32* (2013.01); *E02F 9/0833* (2013.01); *E02F 9/0883* (2013.01); B60K 2015/03523 (2013.01);
(Continued)

(58) Field of Classification Search
CPC .. B60K 15/035; B60K 15/073; B60K 15/067; B60K 15/063; B60K 2015/0636; B60K 15/03504; B60K 2015/03523; B60K 2015/03552; B60K 2015/0355;
(Continued)

(56) References Cited

U.S. PATENT DOCUMENTS 4,767,018 A * 8/1988 Saito ................ B60K 15/03504
                                                    137/587
6,634,341 B2   10/2003 Crary et al.
(Continued)

FOREIGN PATENT DOCUMENTS

CN     104652518 A  *  5/2015  ............ E02F 9/0808
JP      2000-192507      7/2000
(Continued)

OTHER PUBLICATIONS

International Search Report for PCT/JP2018/045670 dated Mar. 5, 2019.

*Primary Examiner* — Atif H Chaudry
(74) *Attorney, Agent, or Firm* — IPUSA, PLLC

(57) ABSTRACT

A shovel includes a lower traveling body, an upper turning body turnably attached to the lower traveling body, a boom pivotably attached to the upper turning body, an arm pivotably attached to the boom, an engine mounted on the upper turning body, a hydraulic pump mounted on the upper turning body, a fuel tank mounted on the upper turning body, a work walkway provided on an upper surface of the fuel tank for the movement of a worker, and a rollover valve provided at the top of the fuel tank at a position different from the work walkway.

13 Claims, 8 Drawing Sheets

(51) Int. Cl.
*E02F 3/32* (2006.01)
*E02F 9/08* (2006.01)
*B60K 15/067* (2006.01)
*B60K 15/063* (2006.01)

(52) U.S. Cl.
CPC ............... *B60K 2015/03552* (2013.01); *B60K 2015/03576* (2013.01); *B60K 2015/0636* (2013.01)

(58) Field of Classification Search
CPC ......... E02F 9/0833; E02F 9/0883; E02F 3/32; E02F 9/0875; E02F 9/24
See application file for complete search history.

(56) References Cited

U.S. PATENT DOCUMENTS

| | | |
|---|---|---|
| 2013/0075396 A1 | 3/2013 | Iwami et al. |
| 2016/0222629 A1 | 8/2016 | Tsuda et al. |

FOREIGN PATENT DOCUMENTS

| | | | |
|---|---|---|---|
| JP | 2008-068779 | | 3/2008 |
| JP | 2013-079106 | | 5/2013 |
| KR | 10-2006-0021582 | | 3/2006 |
| KR | 20060021582 A | * | 3/2006 |
| KR | 20120010870 A | * | 2/2012 |
| WO | 2015/053273 | | 4/2015 |

\* cited by examiner

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2018/045670, filed on Dec. 12, 2018 and designating the U.S., which claims priority to Japanese patent application No. 2017-239019, filed on Dec. 13, 2017. The entire contents of the foregoing applications are incorporated herein by reference.

BACKGROUND

Technical Field

The present disclosure relates to shovels.

Description of Related Art

According to related-art fuel tanks for shovels, a fuel filler cap is provided with the function of exchanging air with the outside, so that air is introduced into the fuel tank through the air exchanging function as fuel inside the tank is supplied to the engine.

SUMMARY

According to an aspect of the present invention, a shovel includes a lower traveling body, an upper turning body turnably attached to the lower traveling body, a boom pivotably attached to the upper turning body, an arm pivotably attached to the boom, an engine mounted on the upper turning body, a hydraulic pump mounted on the upper turning body, a fuel tank mounted on the upper turning body, a work walkway provided on an upper surface of the fuel tank for the movement of a worker, and a rollover valve provided at the top of the fuel tank at a position different from the work walkway.

DETAILED DESCRIPTION

Figure 1:
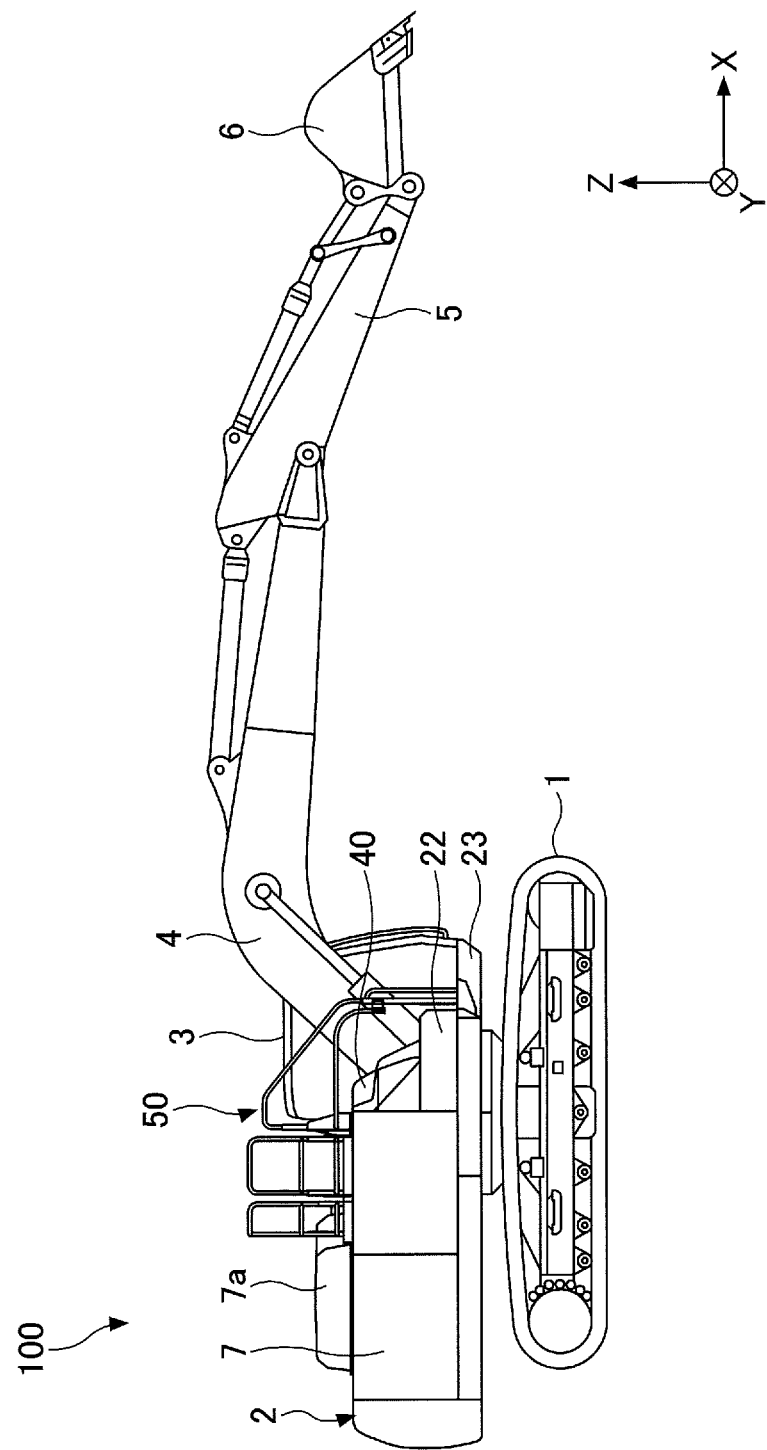
FIG. 1 is a side view of a shovel according to an embodiment of the present invention.

When the fuel filler cap has the air exchanging function as described above, fuel inside the fuel tank may leak to the outside through the air exchanging function when the shovel overturns.

There is a demand for a shovel that can prevent fuel leakage from a fuel tank at the time of overturning.

According to an aspect of the present invention, it is possible to provide a shovel that can prevent fuel leakage from a fuel tank at the time of overturning.

An embodiment is described below with reference to the accompanying drawings. To facilitate the understanding of the description, identical components are referred to using the same reference numeral as much as possible through the drawings, and duplication description thereof is omitted.

In the following description, the X direction, the Y direction, and the Z direction are directions perpendicular to one another, and the X direction and the Y direction are horizontal directions and the Z direction is a vertical direction. The X direction is a front-to-rear direction of the shovel 100. The X direction is positive on the front side and negative on the rear side. The Y direction is a left-to-right widthwise direction of the shovel 100. The Y direction is positive on the left side and negative on the right side. The Z direction is the height direction of the shovel 100. The Z direction is positive on the upper side and negative on the lower side.

FIG. 1 is a side view of the shovel 100 according to the embodiment of the present invention. As illustrated in FIG. 1, the shovel 100 includes a lower traveling body 1, an upper turning body 2, a cabin 3, a boom 4, an arm 5, and a bucket 6. The upper turning body 2 is mounted on the lower traveling body 1 through a turning mechanism (not depicted). The cabin 3 in which an operator seat is provided is placed on the front left of the upper turning body 2. An end of the boom 4 is pivotably attached to the front center of the upper turning body 2. The arm 5 is pivotably attached to the distal end of the boom 4. The bucket 6, which is an end attachment, is pivotably attached to the distal end of the arm 5. End attachments such as a breaker and a crusher are attachable to the distal end of the arm 5 in place of the bucket 6.

When checking or repairing components mounted on the upper turning body 2 of the shovel 100 illustrated in FIG. 1, a worker may climb onto the upper turning body 2. Therefore, safety rails to be held by the worker when the worker climbs onto the upper turning body 2 or for preventing the worker working on the upper turning body 2 from falling are attached to the upper turning body 2.

Figure 2:
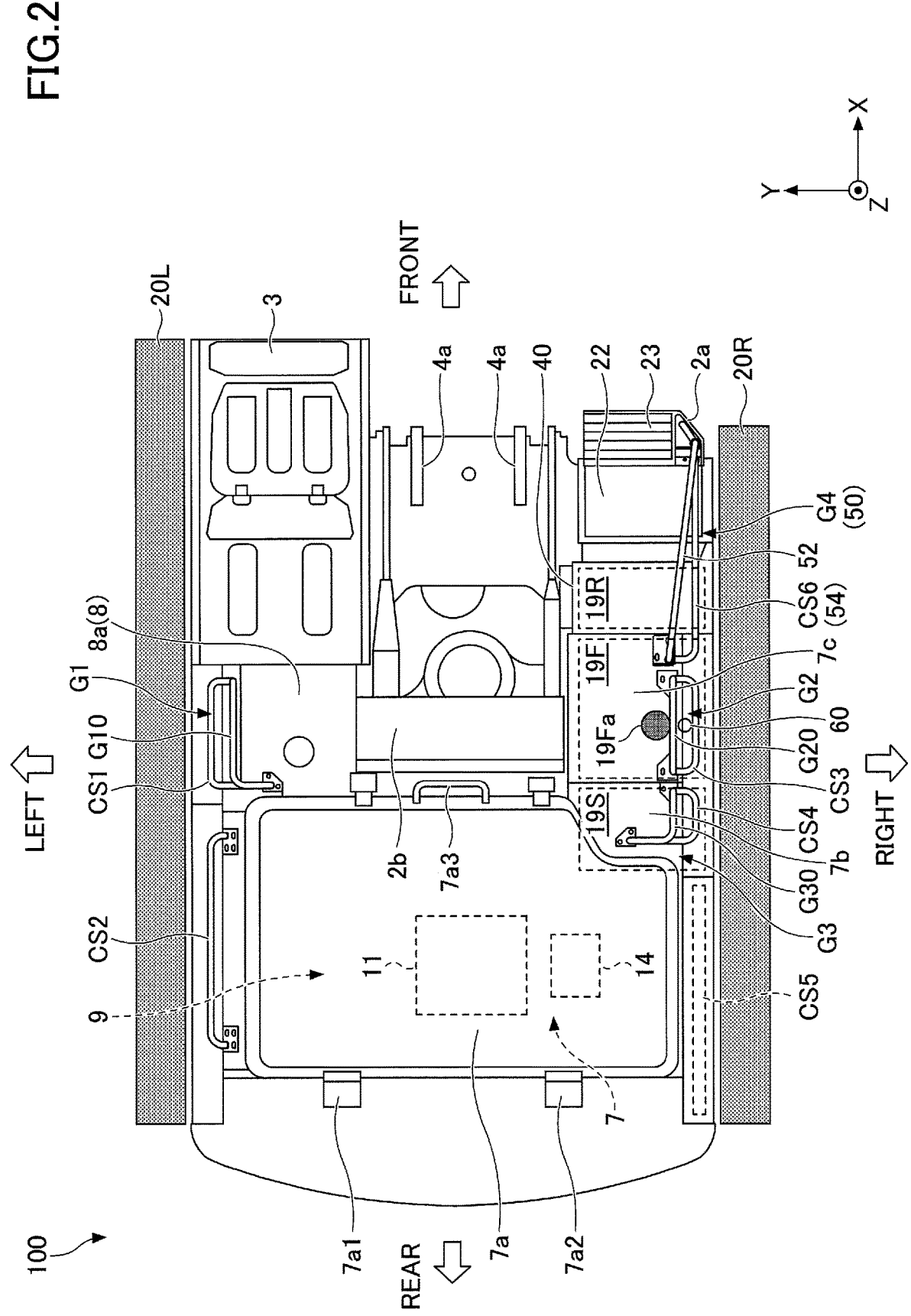
FIG. 2 is a plan view of an upper turning body.
Figure 3:
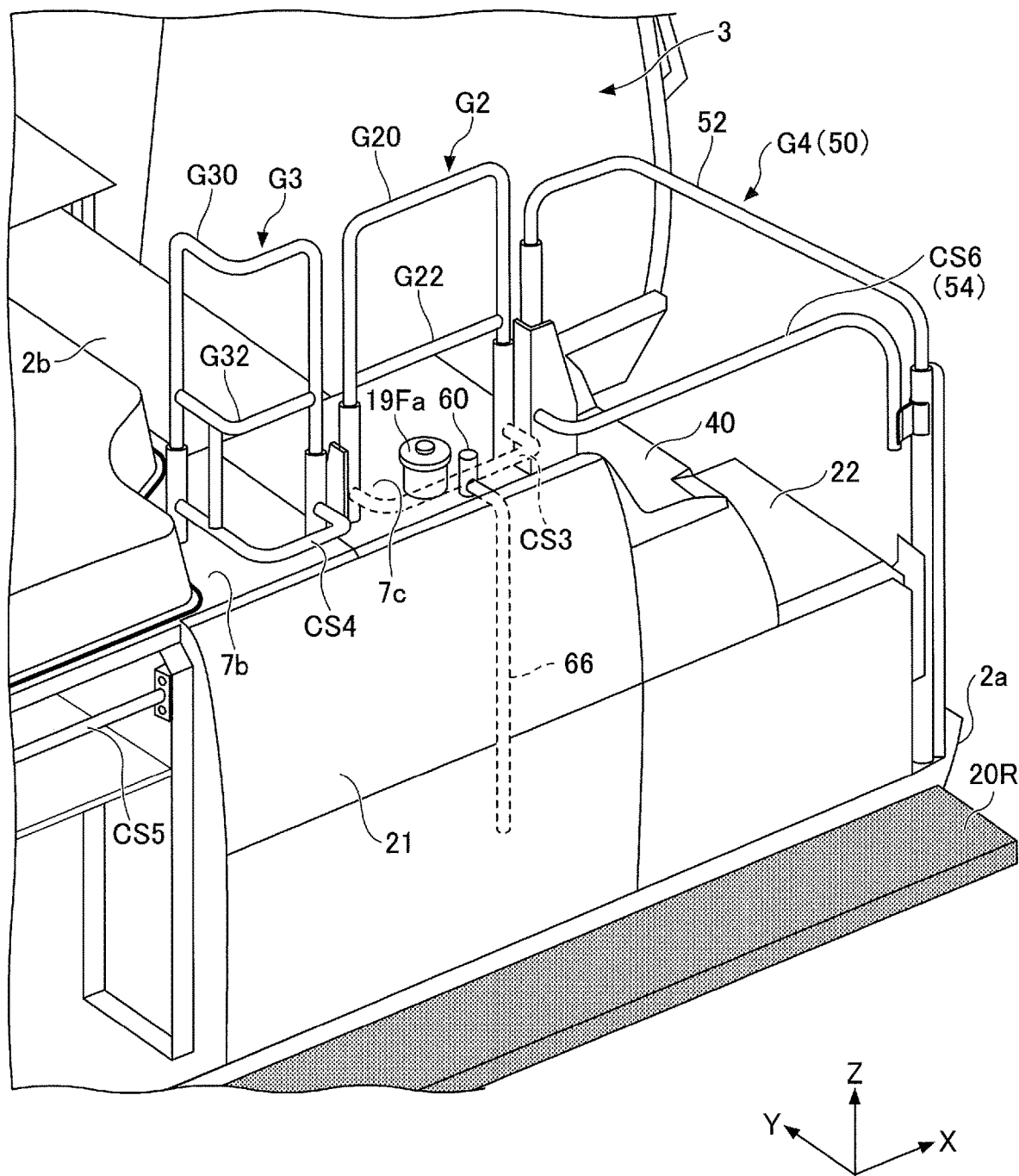
FIG. 3 is an enlarged perspective view of a fuel tank and its vicinity on the upper turning body.

FIG. 2 is a plan view of the upper turning body 2. FIG. 3 is an enlarged perspective view of a fuel tank 19F and its vicinity on the upper turning body 2. For convenience of graphical representation, the boom 4 is removed in FIG. 2.

As illustrated in FIG. 2, an air cleaner chamber 8 is formed behind the cabin 3. The air cleaner chamber 8 contains an air cleaner, etc. The top of the air cleaner chamber 8 is covered with a top plate 8a.

A radiator chamber 9 is formed behind the air cleaner chamber 8. The radiator chamber 9 contains a battery, a radiator, etc. A counterweight is placed behind the radiator chamber 9.

A catwalk 20L is so placed as to extend in the front-to-rear direction along the left end of the upper turning body 2. According to this embodiment, the catwalk 20L is so placed as to extend along a turning frame 2a at the left end of the upper turning body 2, and is removably attached to the turning frame 2a.

A safety rail G1 is a member that prevents a worker working on the upper turning body 2 from falling. According to this embodiment, the safety rail G1 is bolted to the top plate 8a on the air cleaner chamber 8. The safety rail G1 may alternatively be welded to the top plate 8a.

Stays CS1 and CS2 are so arranged as to extend parallel and horizontally in the front-to-rear direction in accordance with the catwalk 20L. Furthermore, the stays CS1 and CS2 are arranged such that their height relative to the catwalk 20L is within a predetermined range. The predetermined range is, for example, 1000 to 1300 mm.

The stay CS1 is welded to an outer frame member G10 of the safety rail G1. As illustrated in FIG. 2, the stay CS1 is so attached as to protrude outward to the left (to the catwalk 20L side) relative to the outer frame member G10 of the safety rail G1. Furthermore, the stay CS2 is bolted.

A pump chamber 7 is formed behind the upper turning body 2. The pump chamber 7 contains an engine 11, a hydraulic pump 14, etc.

The top of the pump chamber 7 and the top of the radiator chamber 9 are covered with an engine hood 7a. A worker can stand up on an upper surface cover 2b placed adjacent to the top plate 8a as illustrated in FIG. 2 and pull up a handle 7a3 at the front of the engine hood 7a to open the engine hood 7a. When the handle 7a3 is pulled up, the engine hood 7a opens on hinges 7a1 and 7a2 serving as a pivot shaft.

A hydraulic oil tank 19S that stores hydraulic oil discharged by the hydraulic pump 14 and the fuel tank 19F that stores fuel to be supplied to the engine 11 are placed in front of the pump chamber 7. Top plates 7b and 7c are installed at the top of the hydraulic oil tank 19S and the fuel tank 19F so that a worker can work on the top plates 7b and 7c.

A catwalk 20R is so placed as to extend in the front-to-rear direction along the right end of the upper turning body 2. According to this embodiment, the catwalk 20R is so placed as to extend along the turning frame 2a at the right end of the upper turning body 2, and is removably attached to the turning frame 2a.

Safety rails G2 and G3 are members that prevent a worker working on the upper turning body 2 from falling. According to this embodiment, the safety rail G2 is bolted to the top plate 7c at the top of the fuel tank 19F. Furthermore, the safety rail G3 is bolted to the top plate 7b at the top of the hydraulic oil tank 19S. The safety rails G2 and G3 may alternatively be welded to the top plates 7b and 7c.

As illustrated in FIGS. 2 and 3, the safety rail G2 includes an outer frame member G20 and a transverse member G22, and both ends of the outer frame member G20 are fixed to the top plate 7C. The inside of the outer frame member G20 is segmented by the transverse member G22. Likewise, the safety rail G3 includes an outer frame member G30 and a transverse member G32, and both ends of the outer frame member G30 are fixed to the top plate 7b. The inside of the outer frame member G30 is segmented by the transverse member G32.

Stays CS3 through CS6 are so arranged as to extend parallel and horizontally in the front-to-rear direction relative to the catwalk 20R. Furthermore, the stays CS3 through CS6 are arranged such that their height relative to the catwalk 20R is within a predetermined range. The predetermined range is, for example, 1000 to 1300 mm.

Specifically, the stay CS3 is welded to the outer frame member G20 of the safety rail G2. The stay CS3 is so attached as to protrude outward to the right (to the catwalk 20R side) relative to the outer frame member G20 of the safety rail G2 and a fuel filler inlet 19Fa.

The stay CS4 is welded to the outer frame member G30 of the safety rail G3. The stay CS4 is so attached as to protrude outward to the right (to the catwalk 20R side) relative to the outer frame member G30 of the safety rail G3. The stay CS5 is bolted to a house frame (not depicted) in the pump chamber 7.

A processing agent tank 19R that stores a processing agent for processing exhaust gas from the engine 11 (for example, an aqueous urea solution serving as a reducing agent) is placed in front of the fuel tank 19F. The upper surface of the processing agent tank 19R is covered with a processing agent tank cover 40 when the processing agent tank cover 40 is closed, and is exposed when the processing agent tank cover 40 is opened. Furthermore, the upper surface of the processing agent tank cover 40 is partly depressed to form a step as illustrated in FIG. 3. This step forms stairs that a worker uses to climb onto the upper turning body 2.

A tool box 22 having enough space for storing work tools, etc., is installed in front of the processing agent tank cover 40. The upper surface of the tool box 22 as well is used as part of the stairs that a worker uses to climb onto the upper turning body 2.

In front of where the tool box 22 is installed, a step 23 is provided as a foot stand used as part of the stairs that a worker uses to climb onto the upper turning body 2. The step 23 is attached to the turning frame 2a in front of where the tool box 22 is installed.

As described above, the upper surface of the step 23, the upper surface of the tool box 22, the upper surface of the processing agent tank cover 40, and the upper surface of the top plate 7c at the top of the fuel tank 19F form the stairs that a worker uses to climb onto the upper turning body 2. A handrail unit 50 serving as a safety rail G4 is attached near the stairs thus formed. The handrail unit 50 is placed on the front right of the upper turning body 2 on the opposite side from the cabin 3 placed on the front left of the upper turning body 2.

Furthermore, a boom support bracket 4a on which the boom 4 is pivotably supported is fixed to the front center of the upper turning body 2. Accordingly, the above-described stairs are formed between the boom support bracket 4a and the handrail unit 50.

The handrail unit 50 includes a handrail 52 serving as a first handrail that a worker holds to support her/his body. Furthermore, the handrail unit 50 includes a handrail 54 serving as a second handrail that extends horizontally below the handrail 52. In addition to serving as the stay CS6 that serves as a handrail for a worker who moves on the catwalk 20R, the handrail 54 serves as a reinforcement member that reinforces the handrail unit 50 (the handrail 52). The front end of the handrail unit 50 (on the lower side) is fixed to the front end face of the turning frame 2a, and the rear end of the handrail unit 50 (on the higher side) is fixed to the upper surface of the top plate 7c at the top of the fuel tank 19F.

A work walkway 70 (see FIG. 5) for a worker performing work such as checking on the upper turning body 2 is formed by part of the top plate 7c at the top of the fuel tank 19F continuous from the above-described stairs which part is on the inner side (on the positive side in the Y direction) of the safety rail G2 on the machine body, part of the top plate 7b at the top of the hydraulic oil tank 19S which part is on the inner side of the safety rail G3 on the machine body, the upper surface cover 2b, and part of the top plate 8a at the top of the air cleaner chamber 8 which part is on the inner side (on the negative side in the Y direction) of the safety rail G1 on the machine body.

According to this embodiment, the outer frame member G20 of the safety rail G2 installed on the top plate 7c of the fuel tank 19F is also described as "a handrail part" for a worker who passes through the work walkway 70 to hold while moving.

The fuel filler inlet 19Fa (liquid filling inlet) of the fuel tank 19F is so placed in the top plate 7c (tank upper surface) as to have an outer end positioned in the Y direction from this handrail part (the outer frame member G20). This placement does not hinder a worker from walking on the work walkway 70 and makes it easier to fuel from each of the work walkway 70 side and the catwalk 20R side. According to this embodiment, the fuel filler inlet 19Fa of the fuel tank 19F is provided at a position other than the work walkway 70. That is, part of the top plate 7c of the fuel tank 19F inward of the fuel filler inlet 19Fa on the machine body serves as the work walkway 70. In the case of installing an antislip sheet on the top plate 7c of the fuel tank 19F for workers' safety, the part of this antislip sheet may serve as the work walkway 70.

It is necessary to prevent a vacuum in the fuel tank 19F by introducing air into the tank as the fuel inside is supplied to the engine 11. For example, as in Patent Document 1, it has been common to provide a fuel filler cap with the air exchanging function. In contrast, according to this embodiment, the cap of the fuel filler inlet 19Fa hermetically seals the fuel filler inlet 19Fa without having the air exchanging function.

Specifically, according to this embodiment, a rollover valve 60 is provided as the air exchanging function of the fuel tank 19F, separately from the fuel filler inlet 19Fa. The rollover valve 60 is normally open to allow the inside of the tank to communicate with the outside of the tank, and is closed when the tank is filled up with fuel to capacity so that the fuel level is high or when the fuel tank tilts because of a shovel rollover. According to the shovel 100 of this embodiment, the fuel filler inlet 19Fa of the fuel tank 19F is closed airtight with a cap, and the rollover valve 60 is provided. Therefore, when the fuel tank 19F is upright, the fuel tank 19F can communicate with the outside air through the rollover valve 60, and when the fuel tank 19F rolls over or overturns, it is possible to prevent leakage of fuel from the fuel filler inlet 19Fa and the rollover valve 60.

The rollover valve 60 is provided at the top of the fuel tank 19F and placed at a position different from the work walkway 70. According to this embodiment, the rollover valve 60 is placed in the top plate 7c of the fuel tank 19F on the outer side of the handrail part (the outer frame member G20) on the machine body. This makes it possible to ensure that the rollover valve 60 is separated from the work walkway 70. Accordingly, the rollover valve 60 can be so placed as not to hinder a worker who walks on the work walkway 70. Furthermore, placing the rollover valve 60 apart from the work walkway 70 makes it possible to reduce adhesion of a foreign object such as earth adhering to a worker's shoes to the rollover valve 60, so that it is possible to reduce the possibility that the rollover valve 60 malfunctions (for example, does not open when the tank is upright) because of a foreign object.

Figure 6:
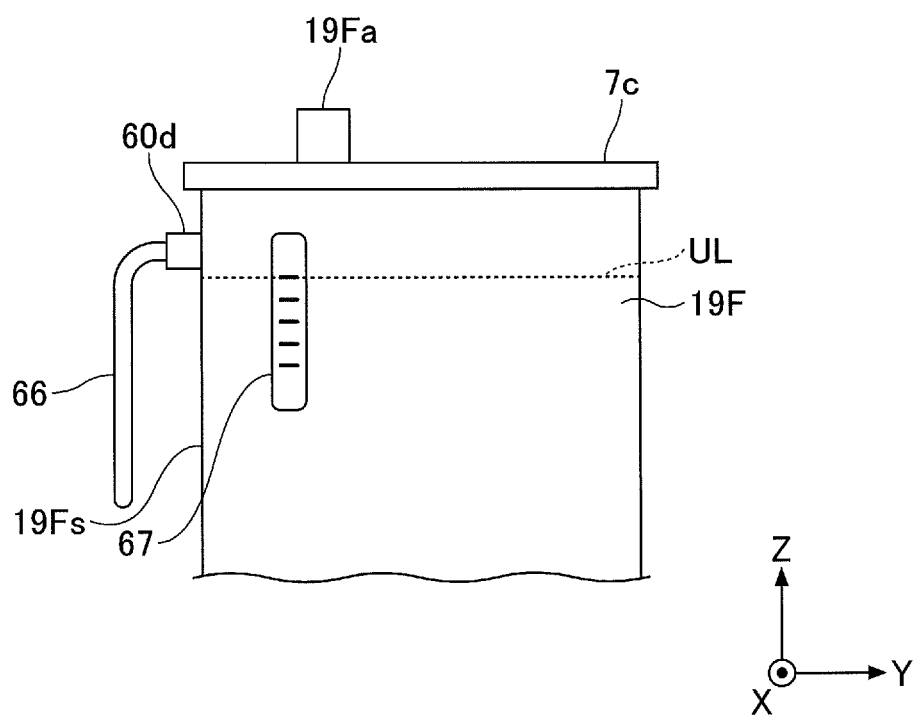
FIG. 6 is a side view of the fuel tank, illustrating a variation of placement of the rollover valve.

Furthermore, the fuel tank 19F has the rollover valve 60, the fuel filler inlet 19Fa, a hose 66, and a liquid level setting upper limit UL (see FIG. 6).

The liquid level setting upper limit UL is the height of a liquid level when the fuel tank 19F is filled with the maximum allowable amount of fuel. A level gauge 67 (see FIG. 6) serving as a fuel gauge is placed on an upper part of a side surface of the fuel tank 19F. The maximum value of a scale shown on this level gauge 67 serves as the liquid level setting upper limit UL. For example, a worker can supply fuel until the liquid level reaches the liquid level setting upper limit UL using this level gauge 67.

Here, the rollover valve 60 is placed above the liquid level setting upper limit UL in order to execute the function of causing air to flow out through the rollover valve 60.

According to this embodiment, the maximum value of a scale shown on the level gauge 67 is set as the liquid level setting upper limit UL, while a position on the scale below the maximum value may be set as the liquid level setting upper limit UL in view of error or the like.

According to this embodiment, the level gauge 67 is used to visually check the liquid level setting upper limit UL, while a float fuel gauge or a fuel gauge sensor may alternatively be used.

In the case of the float type, the tip of the float may be seen through the fuel filler inlet 19Fa when the fuel tank 19F is filled up. In this case, a worker can be aware how much the fuel tank 19F is supplied with fuel by visually checking the position of the tip of the float serving as a fuel gauge while pouring fuel in from the fuel filler inlet 19Fa.

Figure 4A:
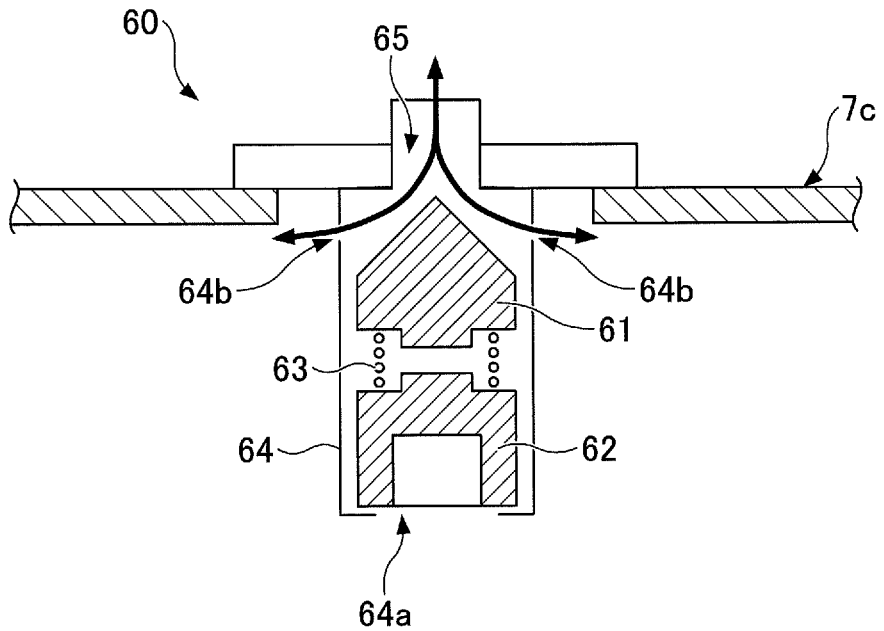
FIG. 4A is a schematic diagram illustrating an example structure of a rollover valve.
Figure 4B:
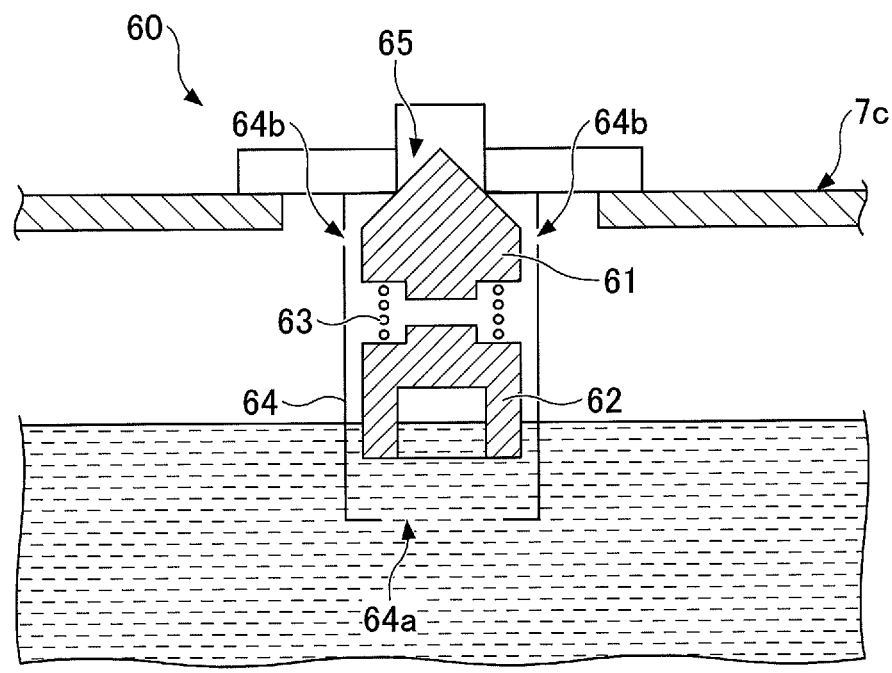
FIG. 4B is a schematic diagram illustrating the example structure of the rollover valve.
Figure 4C:
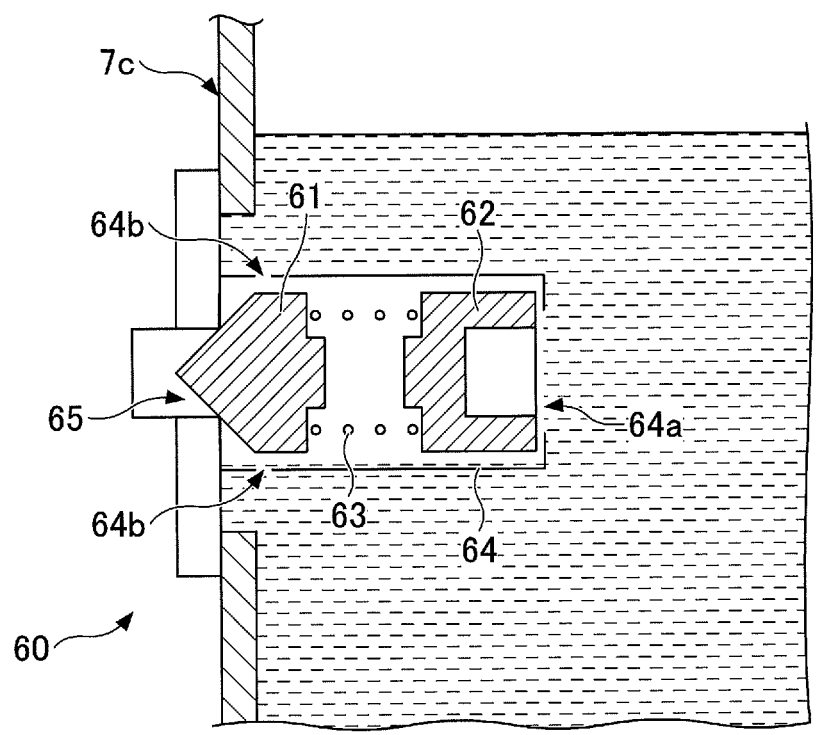
FIG. 4C is a schematic diagram illustrating the example structure of the rollover valve.

FIGS. 4A, 4B and 4C are schematic diagrams illustrating an example structure of the rollover valve 60. As illustrated in FIGS. 4A, 4B and 4C, the rollover valve 60 includes, for example, a valve body 61, a float 62, a spring 63, and a guide 64.

The valve body 61 and the float 62 are accommodated in the guide 64, being connected by the spring 63. The guide 64 is a tubular member configured to allow the valve body 61, etc., to slide along a direction in which the guide 64 communicates with a discharge path 65 provided at a surface of the fuel tank 19F, penetrating through the surface. Furthermore, the guide 64 includes an opening 64a provided at the bottom on the opposite side from the discharge path 65. Communication holes 64b are provided in the circumferential surface of the guide 64.

As illustrated in FIG. 4A, when the fuel tank 19F is upright and the liquid level of fuel inside the tank is below the opening 64a of the guide 64, the guide 64 is positioned immediately below the discharge path 65 with the opening 64a of the guide 64 being the lowest. In the guide 64, the float 62 is positioned below the valve body 61. Referring to FIG. 4A, because the liquid level of fuel inside the tank is below the opening 64a of the guide 64, the float 62 cannot receive buoyancy from the liquid level. Therefore, the float 62 contacts the bottom of the guide 64, so that the spring 63 is compressed by the weight of the valve body 61. As a result, the valve body 61 is separated downward from the discharge path 65 to open the valve. At this point, the communication holes 64b are between the discharge path 65 and the valve body 61. Therefore, the communication holes 64b allow communication between the discharge path 65 and the inside of the tank to allow an inflow of air into the inside of the tank and an outflow of air therefrom to the outside.

In contrast, when the fuel tank 19F is upright and the liquid level of fuel inside the tank is above the opening 64a of the guide 64 as illustrated in FIG. 4B, fuel flows into the guide 64 through the opening 64a to push up the float 62 with buoyancy. As a result, the valve body 61 as well receives buoyancy through the spring 63 to move up and contact the discharge path 65 to close the valve.

Furthermore, as illustrated in FIG. 4C, when the fuel tank 19F rolls over or overturns, the weight of the valve body 61 is not applied to the spring 63. Therefore, the valve body 61 is pushed toward the discharge path 65 to contact the discharge path 65 to close the valve. As a result, the tank is closed airtight, so that it is possible to prevent leakage of fuel to the outside.

Referring back to FIG. 3, the hose 66 for connecting to the atmosphere is connected to the rollover valve 60. Because the opening of the rollover valve 60 is closed by the hose 66, it is possible to further reduce adhesion of a foreign object such as earth to the rollover valve 60, so that it is possible to further reduce the possibility of the malfunctioning of the rollover valve 60 due to a foreign object.

Furthermore, the hose 66 connected to the rollover valve 60 is run over a side surface 19Fs of the fuel tank 19F. More specifically, the hose 66 hangs downward in a gap between the side surface 19Fs of the fuel tank 19F and an outer wall (tank side cover) 21 of the upper turning body 2. This makes it possible to further prevent the entry of foreign objects into the rollover valve 60 through the hose 66.

This embodiment illustrates a configuration where the hose 66 is run downward in a gap between the side surface 19Fs of the fuel tank 19F and the outer wall (tank side cover) 21 of the upper turning body 2, while the hose 66 may alternatively be so run as to hang between the fuel tank 19F and the hydraulic oil tank 19S or so run as to hang along a side surface of the fuel tank 19F on the processing agent tank 19R side (a side surface of the fuel tank 19F on the positive side in the X direction).

Figure 5:
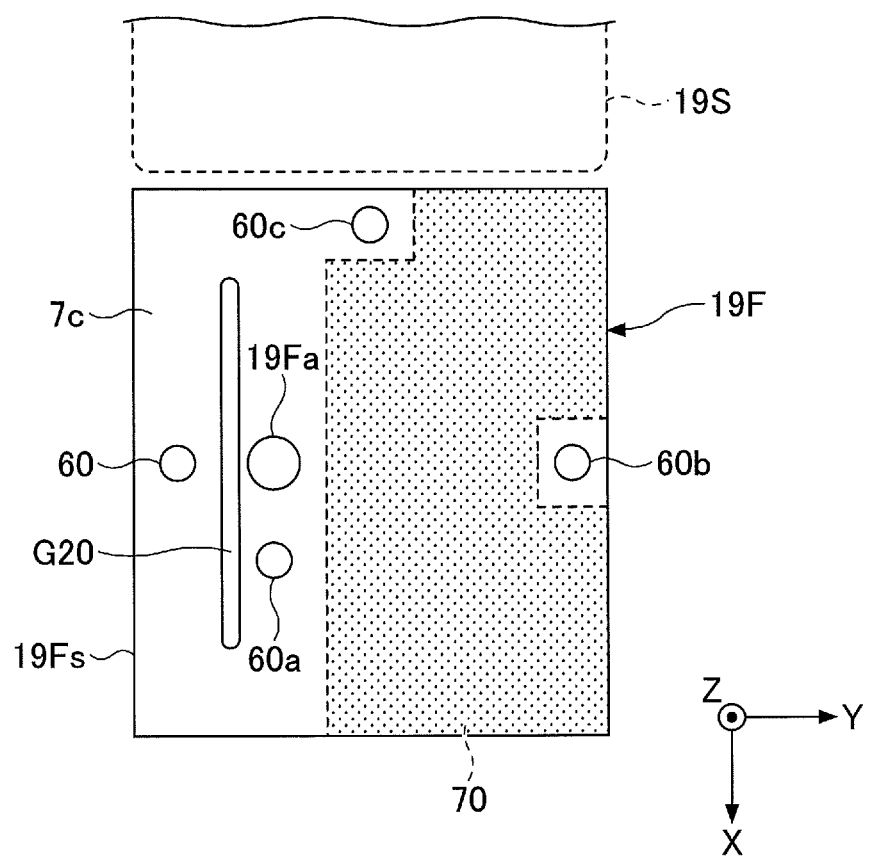
FIG. 5 is a plan view of a fuel tank, illustrating variations of the placement of the rollover valve.

Variations are described with reference to FIGS. 5 and 6. FIG. 5 is a plan view of the fuel tank 19F, illustrating variations of the placement of the rollover valve 60. FIG. 6 is a side view of the fuel tank 19F, illustrating a variation of the placement of the rollover valve 60.

The rollover valve 60 may be provided at a position other than the work walkway 70 on the surface of the fuel tank 19F. For example, the rollover valve 60 may be placed at the same Y-direction position as the fuel filler inlet 19Fa as a rollover valve 60a illustrated in FIG. 5, or outward of the fuel filler inlet 19Fa in the Y direction on the machine body. Alternatively, the rollover valve 60 may be placed at the inner end of the top plate 7c on the machine body as a rollover valve 60b illustrated in FIG. 5, or may be placed at the end of the top plate 7c on the hydraulic oil tank 19S side (on the native side in the X direction) as a rollover valve 60c illustrated in FIG. 5. In these cases, as indicated by a dot pattern in FIG. 5, part of the top plate 7c at the top of the fuel tank 19F other than where the rollover valve 60, 60a, 60b or 60c is installed serves as the work walkway 70.

When the rollover valve 60a, 60b or 60c is installed, the hose 66 is run over a side surface of the fuel tank 19F. For example, when the rollover valve 60a is installed, the hose 66 is so run as to hang downward in a gap between the side surface 19Fs of the fuel tank 19F and the outer wall 21 of the upper turning body 2. When the rollover valve 60b is installed, the hose 66 is so run as to hang along a side surface of the fuel tank 19F on the air cleaner chamber 8 side (see FIG. 2). When the rollover valve 60c is installed, the hose 66 is so run as to hang between the fuel tank 19F and the hydraulic oil tank 19S.

Furthermore, the level gauge 67 is illustrated in FIG. 6. The maximum value of a scale shown on this level gauge 67 serves as the liquid level setting upper limit UL. For example, a worker can supply fuel until the liquid level reaches the liquid level setting upper limit UL using this level gauge 67.

As illustrated in FIG. 6, the rollover valve 60d may be provided above the liquid level setting upper limit UL and on the side surface 19Fs of the fuel tank 19F.

Here, the rollover valve 60 is placed above the liquid level setting upper limit UL in order to execute the function of causing air to flow out through the rollover valve 60.

According to this embodiment, the level gauge 67 is used to visually check the liquid level setting upper limit UL, while a float fuel gauge or a fuel gauge sensor may alternatively be used.

Figure 7A:
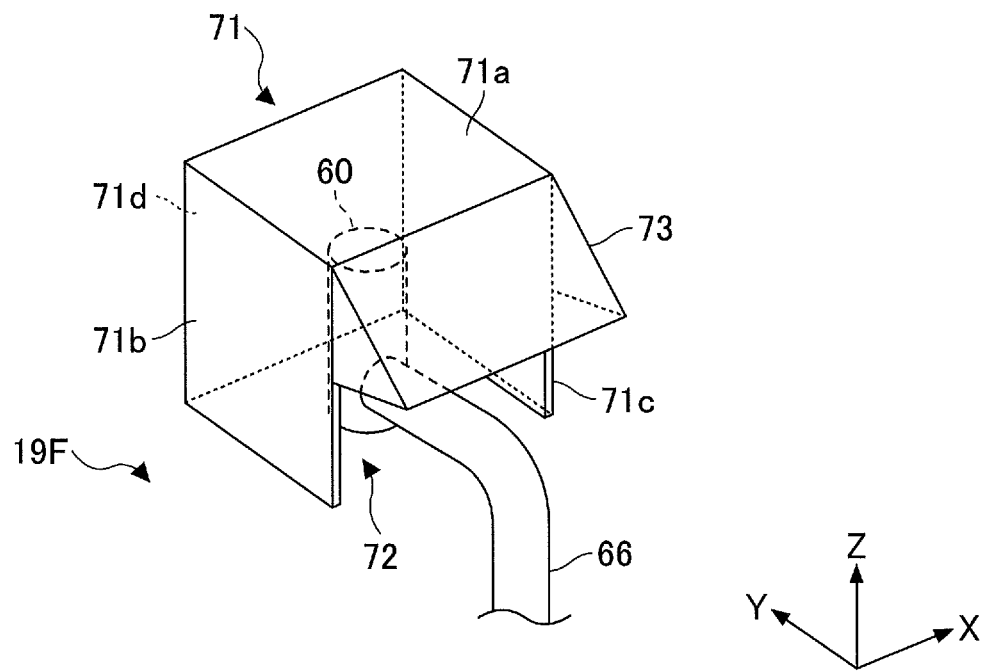
FIG. 7A is a perspective view of a variation that includes a protective cover for the rollover valve.
Figure 7B:
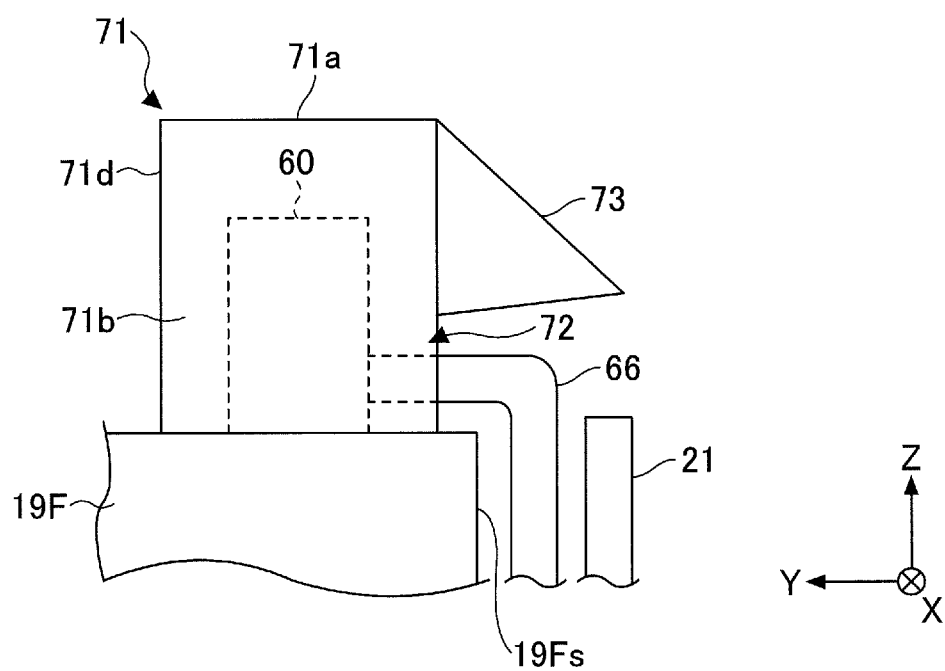
FIG. 7B is a side view of the variation that includes the protective cover for the rollover valve.

Another variation is described with reference to FIGS. 7A and 7B. FIGS. 7A and 7B are a perspective view and a side view, respectively, of a variation which includes a protective cover 71 for the rollover valve 60.

As illustrated in FIGS. 7A and 7B, the shovel 100 according to this embodiment may include the protective cover 71 provided over the rollover valve 60. The protective cover 71 can protect the rollover valve 60 by preventing another object from contacting the rollover valve 60 from above or side. The protective cover 71 is, for example, a box-shaped body having a rectangular parallelepiped shape as illustrated in FIG. 7A, is so provided on a surface of the fuel tank 19F as to cover the rollover valve 60 from above and side with a top wall 71a and sidewalls 71b, 71c and 71d thereof. For example, the protective cover 71 is directly fixed to the fuel tank 19F with bolts or by welding.

The protective cover 71 may at least cover and protect the rollover valve 60 from above, and for example, may dispense with the sidewalls 71b and 71c on both sides of the rollover valve 60 in the X direction. Furthermore, the protective cover 71 may have a desired shape other than a rectangular parallelepiped shape as illustrated in FIG. 7A, such as a dome shape having a predetermined curvature or a cylindrical shape. Furthermore, according to this embodiment, as illustrated in FIGS. 7A and 7B, the top wall 71a of the protective cover 71 is parallel to the upper surface of the fuel tank 19F, while the top wall 71a of the protective cover 71 may alternatively be inclined relative to the upper surface of the fuel tank 19F. Furthermore, the protective cover 71 may be bottomed.

Furthermore, according to the protective cover 71, for example, as illustrated in FIG. 7A, the cubic shape has an opening 72 on one side, through which the hose 66 connected to the side of the rollover valve 60 protrudes. The protective cover 71 includes an eaves part 73 extending in the protruding direction of the hose 66 to be provided over the hose 66. For example, the eaves part 73 is so provided as to form a slope inclined to the negative side in the Z direction while extending to the negative side in the Y direction from the upper side of the side (the opening 72 in FIG. 7A) on which the hose 66 protrudes from the protective cover 71. As a result, the eaves part 73 can prevent another object from contacting the hose 66 from above or side to protect the hose 66. Furthermore, providing the eaves part 73 makes it possible to reduce the entry of foreign objects into the opening 72 of the protective cover 71.

As illustrated in FIG. 7B, the eaves part 73 is preferably provided to protrude from the protective cover 71 to the negative side in the Y direction up to a position where the eaves part 73 can cover the entirety of the hose 66 from above. Furthermore, the eaves part 73 preferably protrudes up to a position where the eaves part 73 covers a gap between the side surface 19Fs of the fuel tank 19F and the outer wall (tank side cover) 21 in which an end of the hose 66 is provided. Furthermore, the eaves part 73 preferably protrudes up to a position over the upper end of the outer wall 21 or a position outward of the upper end. By thus providing the eaves part 73, it is possible to satisfactorily protect the hose 66.

Here, according to this embodiment, by way of example, the rollover valve 60 is placed separately from the fuel filler inlet 19Fa. Alternatively, however, the fuel filler inlet 19Fa may have the function of the rollover valve 60. Specifically, the fuel filler inlet 19Fa has the function described with reference to FIGS. 4A through 4C, and the hose 66 for connecting to the atmosphere is placed on a side surface of the fuel filler inlet 19Fa. In this case, the hose 66 is placed along a surface of the machine body of the shovel.

According to the configuration where the rollover valve 60 and the fuel filler inlet 19Fa are thus integrated as well, the rollover valve 60 and the fuel filler inlet 19Fa may be installed at a position other than the work walkway 70 on the upper surface of the fuel tank 19F. For example, the rollover valve 60 and the fuel filler inlet 19Fa as integrated may be installed at the position of the rollover valve 60, 60a, 60b or 60c as described with reference to FIG. 5, etc.

In the case of integrating the rollover valve 60 and the fuel filler inlet 19Fa into a one-piece structure, when fuel continues to be supplied even after the liquid level rises to close the valve at the time of fueling, fuel may spill over. Therefore, in the case of integrating the rollover valve 60 and the fuel filler inlet 19Fa into a one-piece structure, the rollover valve 60 is preferably configured to switch connection to the atmosphere as desired, for example, to force connection to the atmosphere as desired. This makes it possible to prevent disconnection from the atmosphere even when the liquid level rises at the time of fueling, so that it is possible to prevent an overspill at the time of fueling.

The embodiment is described above with reference to specific examples. The present disclosure, however, is not limited to these specific examples. These specific examples may be suitably subjected to design change by a person of ordinary skill in the art within the scope of the present disclosure to the extent that they have the features of the present disclosure. The elements and their arrangement, conditions, shapes, etc., of the above-described specific examples are not limited to those illustrated, and may be suitably changed. The elements of the above-described specific examples may be suitably combined differently to the extent that no technical contradiction is caused.

The above-described embodiment illustrates a configuration where the hose 66 for connecting to the atmosphere is connected to the rollover valve 60. The hose 66, however, may be omitted. In this case, the rollover valve 60 has an opening for connecting to the atmosphere on its side surface.

What is claimed is:

1. A shovel comprising:
    a lower traveling body;
    an upper turning body turnably attached to the lower traveling body;
    a boom pivotably attached to the upper turning body;
    an arm pivotably attached to the boom;
    an engine mounted on the upper turning body;
    a hydraulic pump mounted on the upper turning body;
    a fuel tank mounted on the upper turning body;
    a work walkway provided on an upper surface of the fuel tank for a movement of a worker;
    a handrail part configured to be held by the worker while the worker moves through the work walkway, the handrail part being placed at a top of the fuel tank; and
    a rollover valve provided at the top of the fuel tank at a position different from the work walkway within a length of the handrail part.

2. The shovel as claimed in claim 1, wherein the rollover valve is provided above a liquid level setting upper limit of the fuel tank.

3. The shovel as claimed in claim 1, wherein the rollover valve is placed outward of a fuel filler inlet provided at the top of the fuel tank in a widthwise direction of the upper turning body.

4. The shovel as claimed in claim 3, wherein the rollover valve is placed outward of the handrail part in the widthwise direction of the upper turning body.

5. The shovel as claimed in claim 1, further comprising:
    a hose for connecting to an atmosphere, the hose being connected to the rollover valve.

6. The shovel as claimed in claim 5, wherein the hose is run over a side surface of the fuel tank.

7. The shovel as claimed in claim 1, further comprising:
    a protective cover provided over the rollover valve.

8. The shovel as claimed in claim 7, wherein the protective cover includes an eaves part extending in a protruding direction of a hose to be provided over the hose, the hose being for connecting to an atmosphere and connected to the rollover valve.

9. The shovel as claimed in claim 1, wherein the rollover valve is integrated with a fuel filler inlet of the fuel tank.

10. The shovel as claimed in claim 1, wherein the rollover valve is configured to switch connection to and disconnection from an atmosphere.

11. The shovel as claimed in claim 1, wherein the position of the rollover valve in a lengthwise direction of the upper tuning body is within the length of the handrail part.

12. The shovel as claimed in claim 1, wherein, in a widthwise direction of the upper turning body, the handrail part is positioned between the work walkway and a lateral side of the upper turning body, and the rollover valve is positioned between the handrail part and the work walkway or between the handrail part and the lateral side of the upper turning body.

13. The shovel as claimed in claim 1, wherein the rollover valve is positioned alongside the handrail part, the handrail part being elongated in a lengthwise direction of the upper turning body.

* * * * *